United States Patent
Santhanam et al.

(10) Patent No.: US 8,891,425 B2
(45) Date of Patent: Nov. 18, 2014

(54) PAGING ACCESS TERMINALS IN A WIRELESS COMMUNICATIONS SYSTEM

(75) Inventors: Arvind V. Santhanam, San Diego, CA (US); Bongyong Song, San Diego, CA (US); Harleen K. Gill, San Diego, CA (US); Arulmozhi K. Ananthanarayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1034 days.

(21) Appl. No.: 12/753,646

(22) Filed: Apr. 2, 2010

(65) Prior Publication Data

US 2010/0260090 A1 Oct. 14, 2010

Related U.S. Application Data

(60) Provisional application No. 61/168,432, filed on Apr. 10, 2009, provisional application No. 61/175,638, filed on May 5, 2009.

(51) Int. Cl.
*H04W 72/04* (2009.01)
*H04W 68/02* (2009.01)

(52) U.S. Cl.
CPC ................... *H04W 68/025* (2013.01)
USPC ....................................... 370/312

(58) Field of Classification Search
CPC ....... H04W 84/18; H04W 84/12; H04W 4/06; H04W 7/216; H04W 80/04; H04W 88/06; H04W 74/08; H04W 88/08; H04W 72/04; H04W 76/04; H04W 76/00; H04W 8/26; H04J 3/0076; H04B 7/2628
USPC ......... 370/320, 310, 312, 328–329, 335, 338, 370/349, 471, 473–474; 455/458, 515
See application file for complete search history.

(56) References Cited

U.S. PATENT DOCUMENTS

2005/0064886 A1  3/2005  Kim et al.
2005/0186973 A1*  8/2005  Gaal et al. ............... 455/458
(Continued)

FOREIGN PATENT DOCUMENTS

EP  1418686 A2  5/2004
WO  WO2005048616 A1  5/2005
(Continued)

OTHER PUBLICATIONS

Zou, J., et al., "HRPD Enhancements for Improved Support of Priority Services", 3GPP2 Contribution, Mar. 31, 2008, C10-20080331-021, URL, ftp://ftp.3gpp2.org/TSGC/Working/2008/2008-03-Montreal/TSG-C-2008-04-Montreal/WG1/C10-20080331-021_ALU_HRPD_Enhancements_Priority_Services.pdf.

(Continued)

*Primary Examiner* — Kwang B Yao
*Assistant Examiner* — Syed M Bokhari
(74) *Attorney, Agent, or Firm* — Michael F. Taveira

(57) ABSTRACT

An embodiment is directed to an access network that configures set of paging indicator (PI) bits within a quick paging channel (QPCH) cycle to page a group of access terminals. An access terminal within the group receives the QPCH cycle, and evaluates the PI bits to determine whether a unicast page and/or group page is present. Another embodiment is directed to selecting less than all timeslots in one or more control channel cycles of a downlink control channel, and configuring a page message to convey the selected timeslots to an access terminal. The access terminal receives the configured page message and decodes information only within the selected timeslots. Another embodiment is directed to generating a transport-layer message for transmission to at least one access terminal, and configuring the transport-layer message by modifying an application-layer portion of the transport-layer message. An access terminal receives the message and extracts the application-layer portion.

22 Claims, 9 Drawing Sheets

(56) References Cited

U.S. PATENT DOCUMENTS

| | | | |
|---|---|---|---|
| 2007/0037589 A1* | 2/2007 | Watson et al. | 455/458 |
| 2007/0238442 A1 | 10/2007 | Mate et al. | |
| 2008/0081645 A1* | 4/2008 | Kim et al. | 455/458 |
| 2008/0137588 A1* | 6/2008 | Santhanam | 370/320 |
| 2008/0232293 A1 | 9/2008 | Mooney et al. | |
| 2008/0293437 A1* | 11/2008 | Ranganathan et al. | 455/458 |
| 2009/0030365 A1 | 1/2009 | Tokumoto et al. | |
| 2009/0080355 A1 | 3/2009 | Song | |
| 2009/0080356 A1 | 3/2009 | Song et al. | |
| 2009/0080365 A1 | 3/2009 | Song et al. | |
| 2009/0280848 A1* | 11/2009 | Park et al. | 455/515 |
| 2012/0276934 A1* | 11/2012 | Willey et al. | 455/458 |

FOREIGN PATENT DOCUMENTS

| | | |
|---|---|---|
| WO | WO2005079086 | 8/2005 |
| WO | 2009042513 | 4/2009 |

OTHER PUBLICATIONS

International Search Report and Written Opinion—PCT/US2010/030585, International Search Authority—European Patent Office—Sep. 24, 2010.

Partial International Search Report—PCT/US2010/030585, International Search Authority—European Patent Office Jul. 21, 2010.

\* cited by examiner

PAGING ACCESS TERMINALS IN A WIRELESS COMMUNICATIONS SYSTEM

CLAIM OF PRIORITY UNDER 35 U.S.C. §119

The present application for patent claims priority to Provisional Application No. 61/168,432 entitled "PAGING ACCESS TERMINALS IN A WIRELESS COMMUNICATIONS SYSTEM", filed on Apr. 10, 2009, and Provisional Application No. 61/175,638 entitled "PAGING ACCESS TERMINALS IN A WIRELESS COMMUNICATIONS SYSTEM", filed on May 5, 2009, and each of which is incorporated herein by reference herein in its entirety.

BACKGROUND OF THE INVENTION

1. Field of the Invention

Embodiments of the invention relates to communications in a wireless telecommunication system and, more particularly to paging access terminals in a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

An embodiment is directed to an access network that configures set of paging indicator (PI) bits within a quick paging channel (QPCH) cycle to page a group of access terminals. An access terminal within the group receives the QPCH cycle, and evaluates the PI bits to determine whether a unicast page and/or group page is present. Another embodiment is directed to selecting less than all timeslots in one or more control channel cycles of a downlink control channel, and configuring a page message to convey the selected timeslots to an access terminal. The access terminal receives the configured page message and decodes information only within the selected timeslots. Another embodiment is directed to generating a transport-layer message for transmission to at least one access terminal, and configuring the transport-layer message by modifying an application-layer portion of the transport-layer message. An access terminal receives the message and extracts the application-layer portion.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
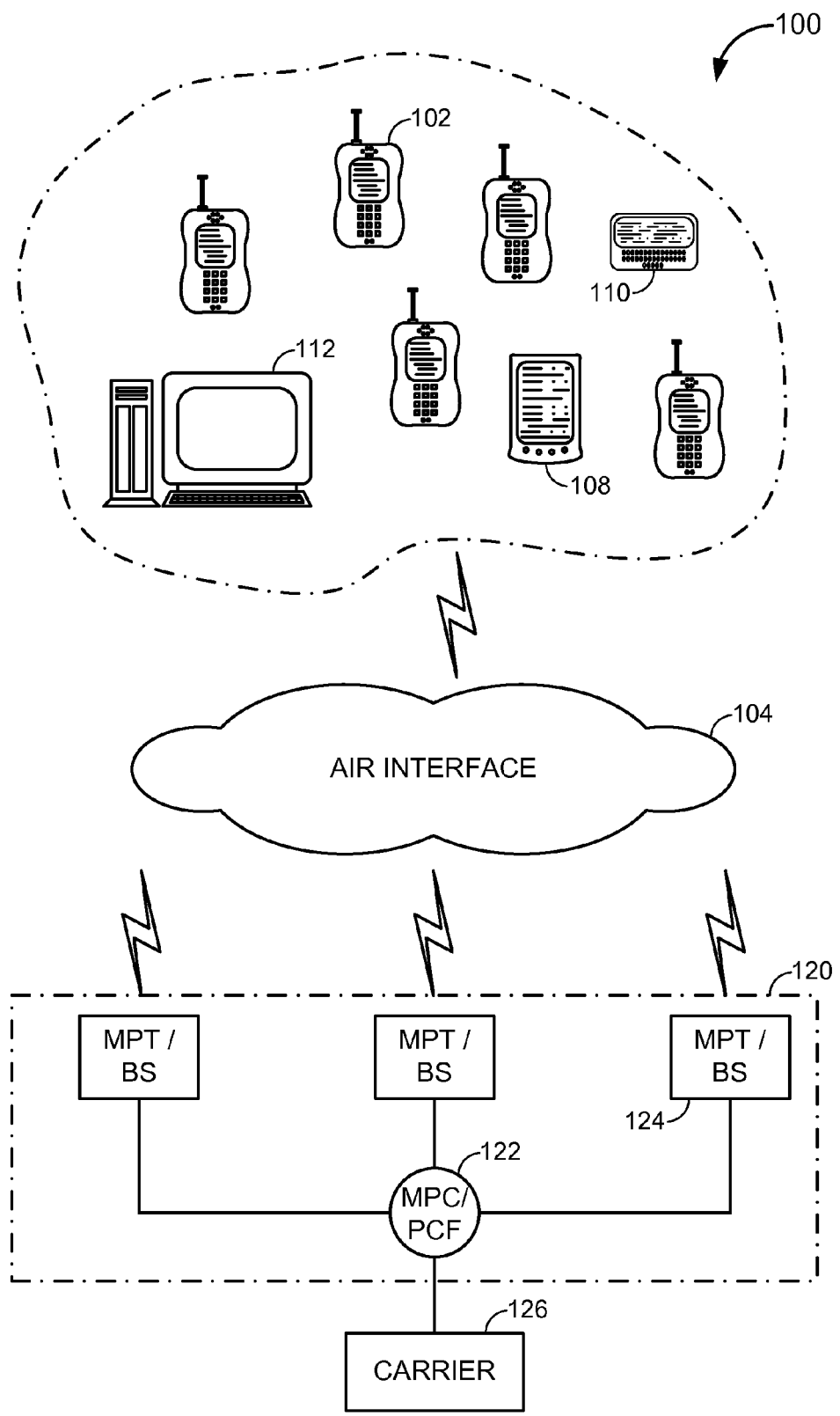
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 160 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
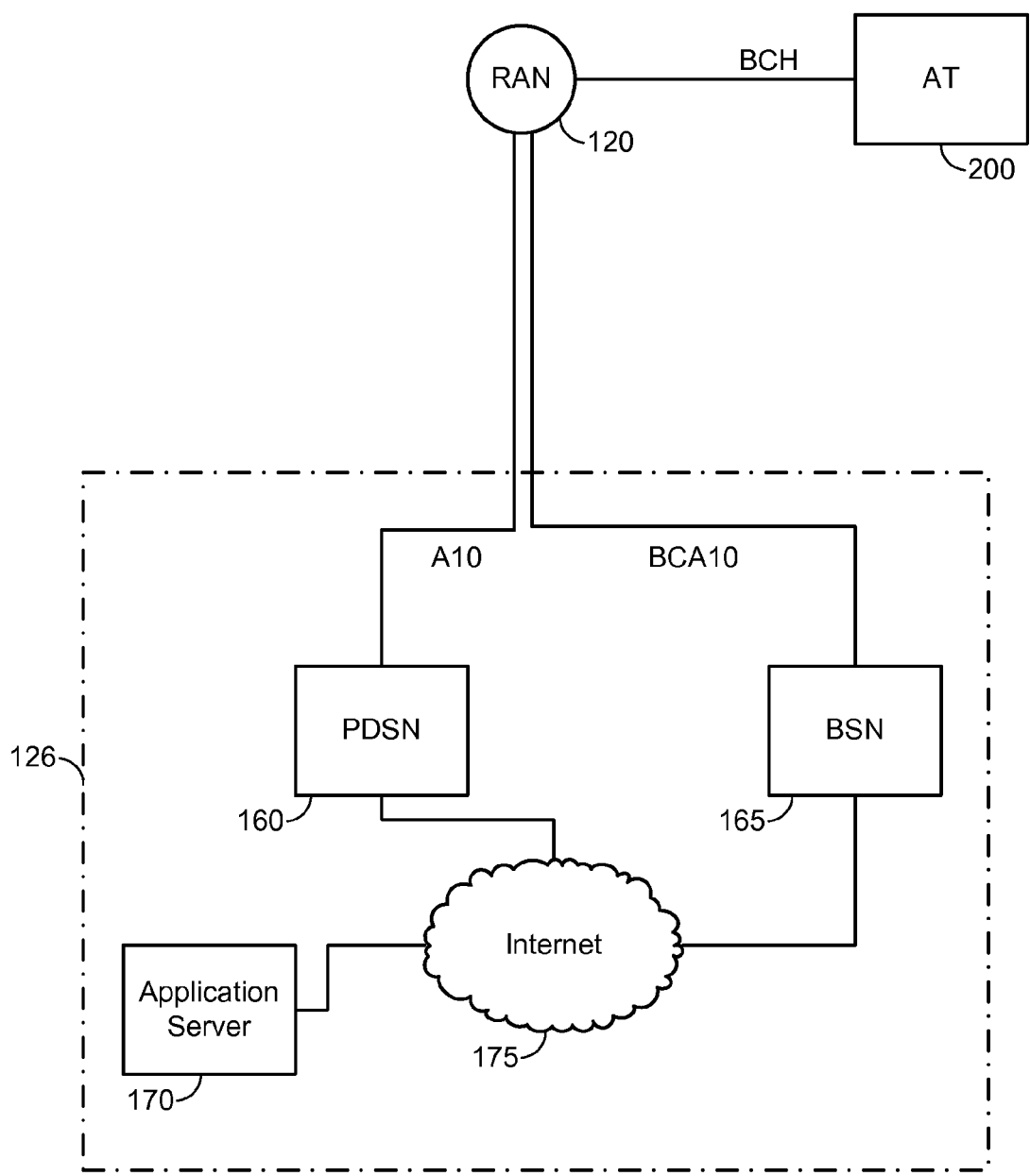
FIG. 2 illustrates a carrier network according to an embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity. While not illustrated, the application server 170 may be configured to include a broadcast and multicast service (BCMCS) content provider, one or more AAA servers, a push-to-talk (PTT) server, a media duplicator, a group management database, a call logging device, etc., the function of each being well-known in the art.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BC A10 connection is used to transfer multicast and/or broadcast messaging. Accordingly, the application server 170 sends unicast messaging to the PDSN 160 via the Internet 175, and sends multicast messaging to the BSN 165 via the Internet 175.

Again referring to FIG. 2, a BCMCS content server (not shown) makes BCMCS content (e.g., push-to-talk (PTT) audio packets) available within an IP multicast stream. If higher layer encryption is enabled, the BCMCS content server may encrypt the stream content.

Generally, as will be described in greater detail below, the RAN 120 transmits multicast messages, received from the BSN 165 via the BC A10 connection, over a broadcast channel (BCH) of the air interface 104 to one or more access terminals 200. As used herein, "multicast messages" and "multicasting" is intended to encompass any group communication, or any communication that potentially includes more than two participants, where the RAN 120 is aware of the AT(s)' group membership associations. For example, irrespective of whether the application server 170 connects three ATs via IP unicasting or IP multicasting protocols, the resultant call may still be considered a multicast call as used herein (except where IP multicast or unicast are specifically referenced), so long as the RAN 120 is aware that the three ATs are participating in a group communication (e.g., although it is possible at least one 'listener' to the group communication never registers to the session). Likewise, if a call initiator attempts to target two or more other ATs for a group call, and only one AT responds for at least a period of time, the resultant call is still a group or multicast call despite there only being two participants for a period of time. However, certain embodiments, such as where reference is made to the Multicast Access Terminal Identifier (MATI) for example, are more specifically to an IP multicasting implementation, and not necessarily a group or multicast session based on IP unicasting because MATIs are not typically used in IP unicasting).

Figure 3:
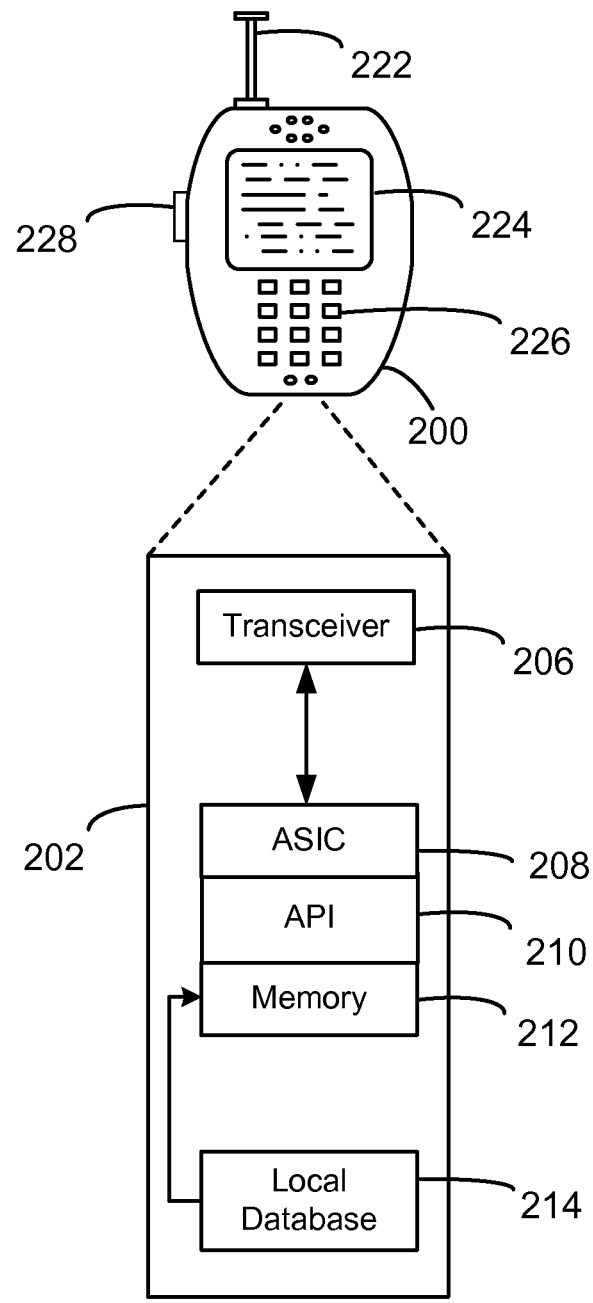
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet 175, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
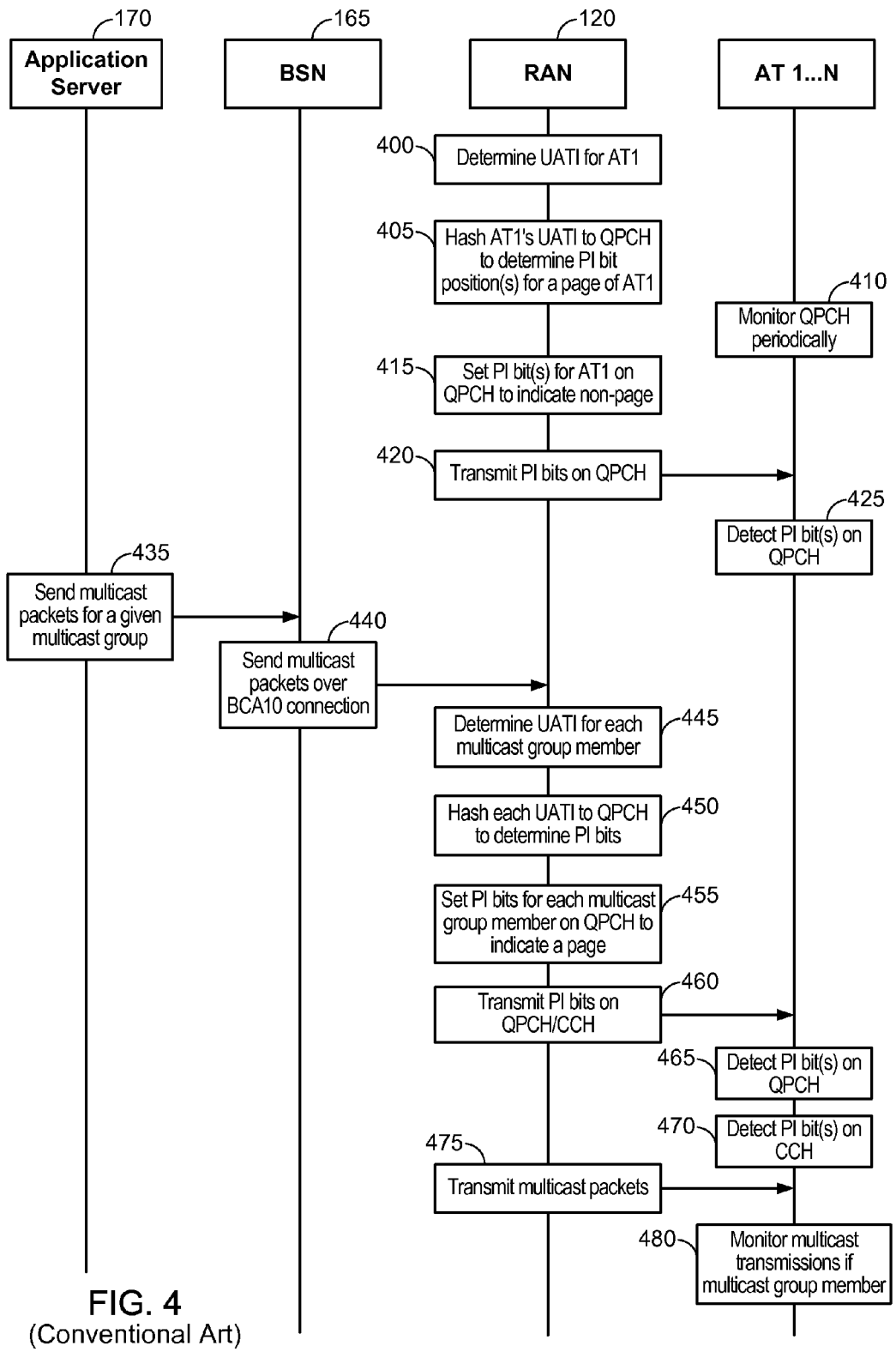
FIG. 4 illustrates a conventional process of paging multicast group members for a multicast communication.
Figure 5:
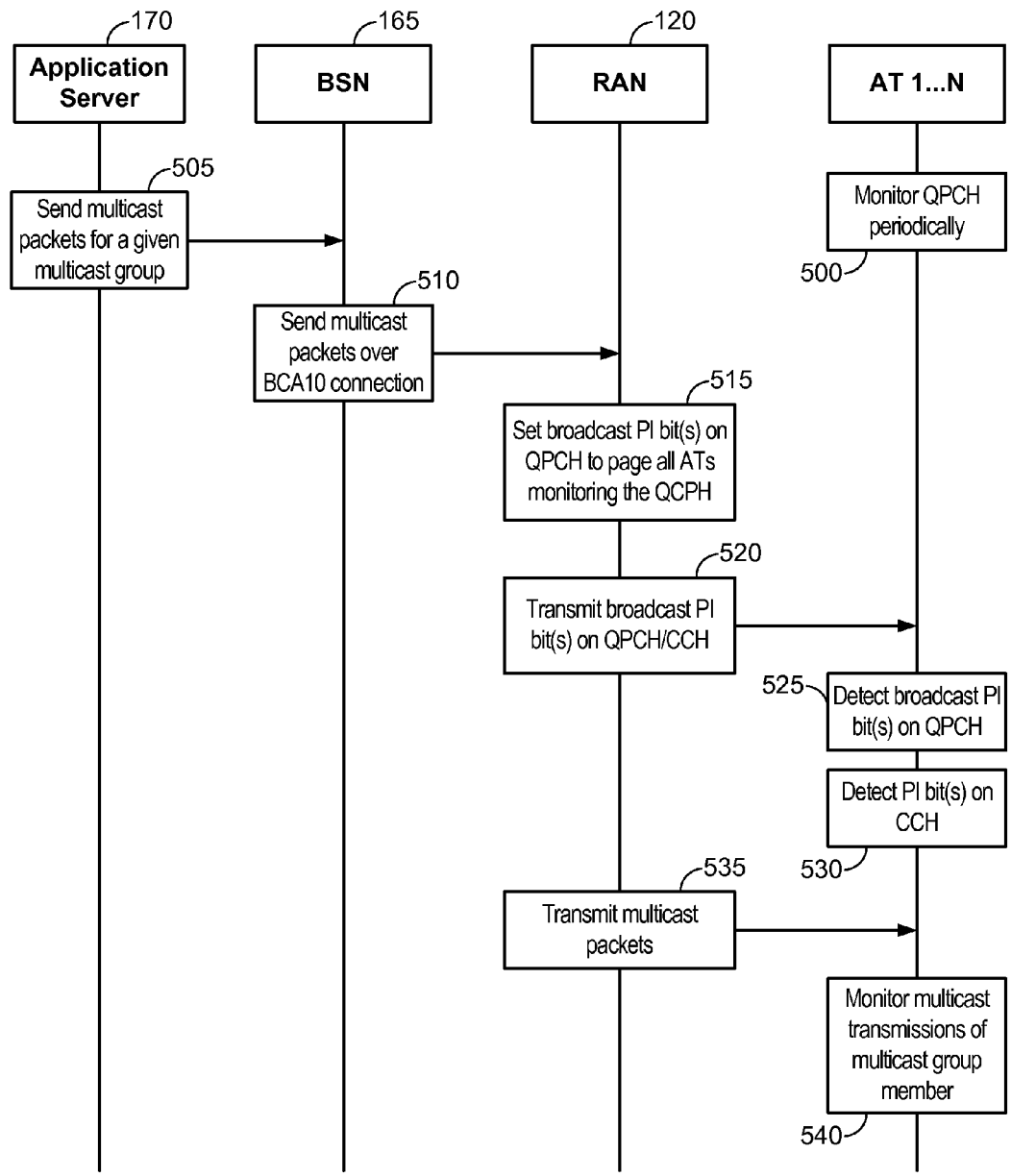
FIG. 5 illustrates another conventional process of paging multicast group members for a multicast communication.
Figure 6:
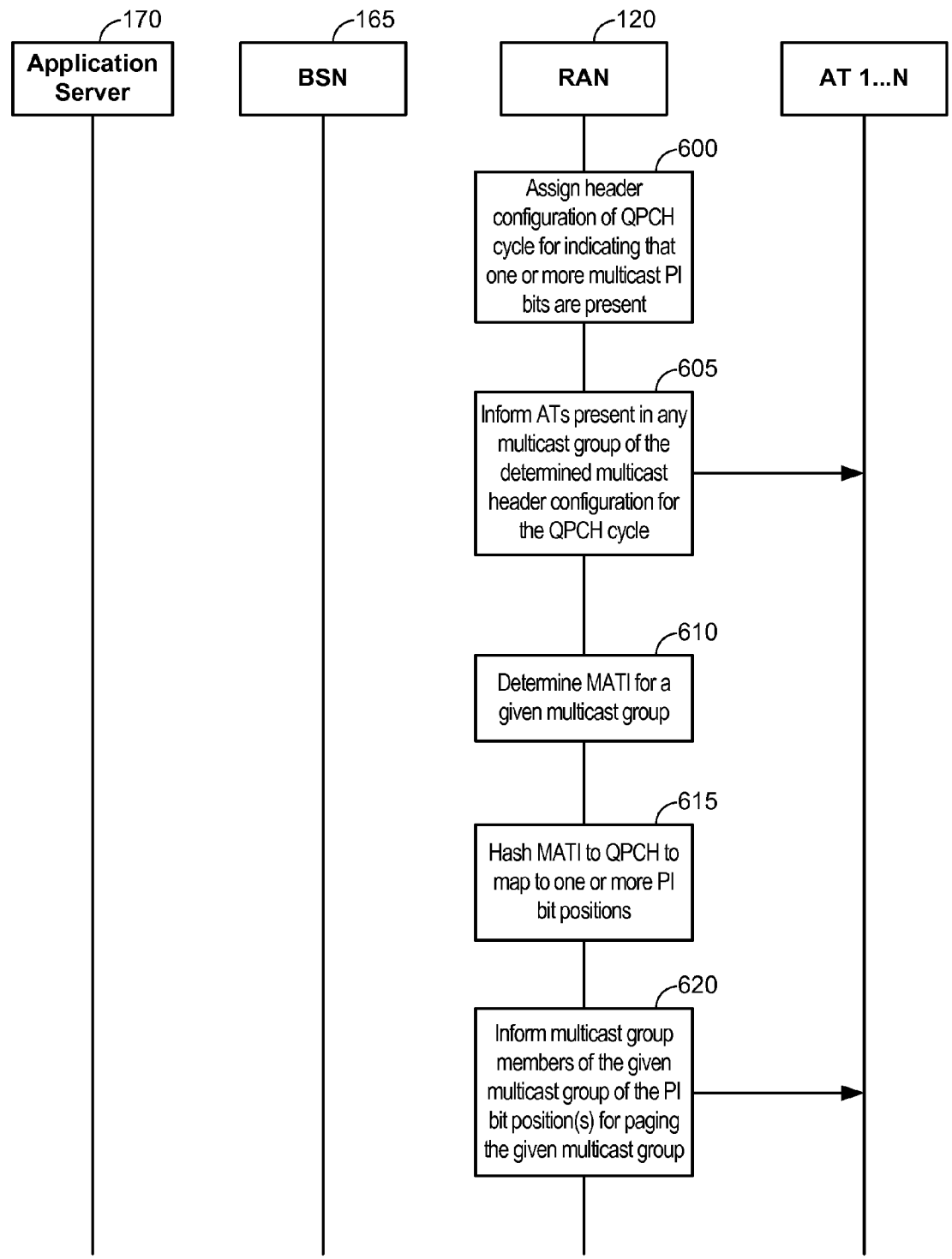
FIG. 6 illustrates a process of assigning paging indicator bits within a quick paging channel to multicast groups.
Figure 7:
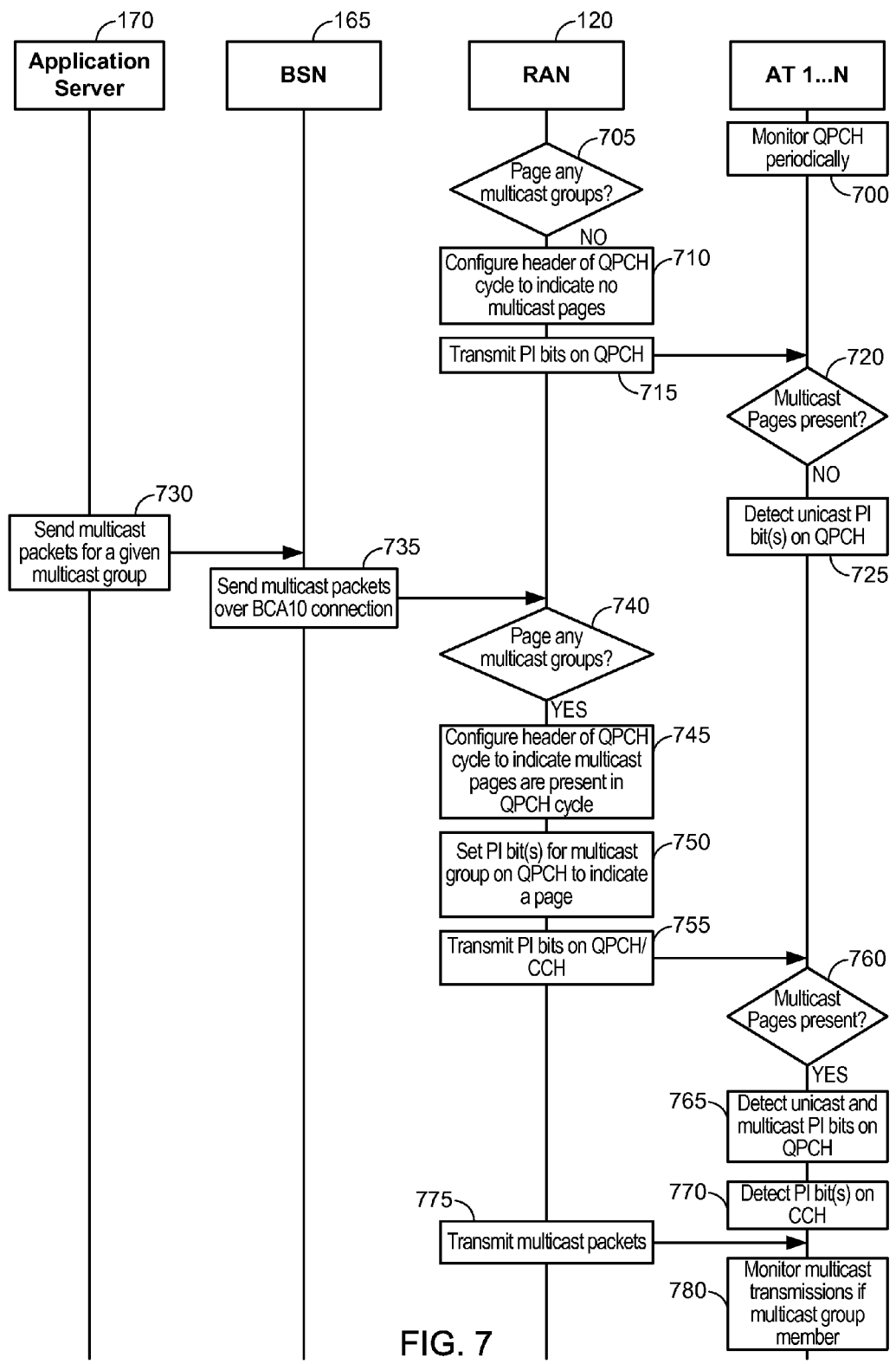
FIG. 7 illustrates a process of paging multicast group members for a multicast communication according to an embodiment of the present invention.

In order to better understand the present invention, conventional methods of paging members of a multicast group with paging indicator (PI) bits on a quick paging channel (QPCH) are described with respect to FIGS. 4 and 5, followed by multicast paging protocols on the QPCH in accordance with an embodiment of the present invention with respect to FIGS. 6 and 7. As used herein, a 'multicast' group is intended to refer to a group call supported by IP multicasting protocols and/or IP unicasting protocols, unless a particular protocol is referred to with respect to a particular embodiment. For example, a multicast access terminal identifier (MATI) is typically used with respect to IP multicasting, but not IP unicasting.

Below, FIGS. 4 through 7 are described such that pages occur on a downlink control channel (CCH). This description, therefore, is at least directly applicable to wireless protocols, such as EV-DO, that include a downlink CCH for paging access terminals within the wireless communication system. However, it will be appreciated that, in alternative embodiments, other downlink channels can be used to page ATs. For example, a paging channel (PCH) and/or a downlink common control channel (F-CCCH) are used in 1x to page ATs. Likewise, a quick paging channel (QPCH) is implemented as a logical channel or sub-channel in EV-DO over the CCM and is transmitted as a separate message at a specific slot (e.g., although the QPCH can require some specific handling at the Physical layer). In 1x, the QPCH is a physical channel. Accordingly, while described below as a logical channel in embodiments described with respect to EV-DO, other embodiments can be directed to the QPCH as a separate physical channel.

Accordingly, while described below with respect to EV-DO terminology, it will be appreciated that the embodiments are not limited to EV-DO implementations. Accordingly, as used herein, the downlink CCH is defined as any broadcast channel that a given AT monitors periodically when operating in the idle mode for mobile-terminated data, with the definition for the CCH only being limited if explicit reference is given to a particular wireless communications protocol (e.g., EV-DO Rev. A, Rev. B, 1x, etc.) is otherwise indicated. Likewise, references to CCH capsules below may be designated differently in other protocols, such as by the more generic term "timeslots", in an example. Also, while certain protocols define a 'page message' as being a specific type of message, page messages referred to hereinafter are intended to be broadly interpreted as corresponding to any downlink message that instructs an AT or ATs to monitor a downlink channel (e.g., a downlink CCH, PCH, F-CCCH, etc.), except where otherwise indicated.

FIG. 4 illustrates a conventional process of paging multicast group members for a multicast communication. The QPCH is a forward link channel that is used to page access terminals within the wireless system 100. A particular cycle of the QPCH, in EV-DO, may be carried upon a given control channel capsule within a CCH cycle, with one QPCH cycle being transmitted per control channel capsule (e.g., although it is also possible to provide the QPCH cycle less often, such as at every other CCH cycle, and so on). The QPCH conserves power at access terminals because the access terminals need only periodically monitor the QPCH, instead of continuously monitoring a transmission channel and/or the downlink control channel. If the QPCH indicates a "potential" page, the access terminal next monitors or evaluates another downlink channel portion to confirm whether the access terminal has been paged. For example, in EV-DO, the access terminal would monitor the control channel capsule subsequent to the QPCH cycle on the downlink control channel cycle, while in 1x, in an example, the access terminal would monitor a paging channel that is offset from the end of the QPCH cycle by a given amount of time, such as 20 ms.

In 400, the RAN 120 determines a unicast access terminal identifier (UATI) for a given AT ("AT1") among ATs 1 ... N. Next, in 405, the RAN 120 applies a hash function to the UATI for AT1 (e.g., or other unique identifier, as discussed below) in order to map the UATI to a paging indicator (PI) bit on the QPCH cycle to AT1.

Generally, each access terminal among ATs 1 ... N will be assigned a given PI bit on the QPCH cycle based on each access terminal's unique identifier (e.g., UATI in 1xEV-DO, MATI in 1xEV-DO, IMSI in 1x, etc.), and the process of FIG. 4 has been described with respect to AT1 for convenience of explanation. Below, embodiments of the present invention are described as being applied to UATIs in accordance with 1xEV-DO. However, it will be readily appreciated that these embodiments could be modified by one of ordinary skill in the art so as to conform with unique identifiers consistent with other standards (or with MATIs in 1xEV-DO). For example, a SessionSeed for an AT can be used to uniquely identify the AT instead of the UATI. The number of UATI's within the wireless communications system 100 can be relatively high, whereas the number of available PI bits on the QPCH cycle is relatively low. Thus, in 405, the RAN 120 maps or "hashes" the UATIs to assign each AT an PI bit (or more than one bit), 405, where the same PI bit(s) can be assigned to different ATs.

Thus, if a PI bit or bits is set to indicate a page, the PI bit(s) only indicate a "potential" page because the PI bit(s) could actually be indicating a page for another access terminal that has been assigned the same PI bit(s).

Returning to 405, the hash function for the UATI can correspond to any well-known hash function, and can be based on the number of PI bits in each QPCH cycle. For example, assume that each QPCH cycle (e.g., which is transmitted at a given period, such as every 200 ms or once per CCH cycle on a given CCH capsule as noted above) includes 16 PI bits. Thus, in an example, the hash function can mask all but the 4 least significant bits (LSBs) of AT1's UATI, and to use the binary number indicated by the 4 LSBs as the position of AT1's assigned PI bit. Thus, if the 4 LSBs of AT1's UATI are "0000", AT1 can be assigned the $1^{st}$ LSB of the 16 PI bits. If the 4 LSBs of AT1's UATI are "1110", AT1 would be assigned the $15^{th}$ LSB or $2^{nd}$ most significant bit (MSB) of the 16 PI bits, and so on. However, it will be appreciated that any well-known hashing function can be used in step 405.

In an example, the QPCH cycle can correspond to a QPCH message (e.g., a given bit or field, a synchronous or sub-synchronous Control Channel header, etc., which is discussed below in more detail) in EV-DO Revision A. In another example, the QPCH cycle can correspond to a Quick Page message transmitted as part of the Quick Synchronous Control Channel Capsule with Quick Paging Indicator bits in 1xEV-DO. In another example, the QPCH cycle can be a QuickPage message in EV-DO revision B. In another example, the QPCH cycle can correspond to a QPCH as a physical downlink channel with PI bits in 1x. Accordingly, it will be appreciated that while reference is made to QPCH cycle in embodiments of the present invention described below, QPCH cycles are intended to be read broadly upon any channel, or any timeslot (e.g., a control channel capsule) of a given channel, that conveys information with regard to whether to check another downlink channel or channel portion (e.g., a paging channel in 1x, a subsequent control channel capsule on the CCH in EV-DO, etc.) to confirm a page. In another example, the QPCH cycle can correspond to a proprietary message that includes or encapsulates a given message (e.g., a QuickPage message) that indicates a potential arrival of a subsequent page (or other message) to the AT. For example, the proprietary message can be encapsulated as part of a StorageBlobRequest (e.g., a BCMCSFlowRegistration request) or StorageBlobAssignment message in EV-DO, and transmitted in an initial control channel MAC packet in the synchronous or sub-synchronous capsules.

In 410, AT1 periodically monitors its assigned PI bit(s) on the QPCH to determine whether there is a possibility that AT1 is being paged. For example, AT1 can be in an idle state (e.g., such as when the access terminal is not engaged in a telephone call, a multicast session, etc.), and can periodically power-up to check a given QPCH cycle in order to determine whether AT1 is being paged. In a further example, a PI bit or bits set to a higher logic level (e.g., binary "1") can indicate a page, and a PI bit or bits set to a lower logic level (e.g., binary "0") can indicate a non-page.

In 415, assume that the RAN 120 determines that AT1 is not to be paged. Further assume that no other AT among ATs 2 . . . N, that has been assigned the same PI bit(s) as AT1, is to be paged. With these assumptions, the RAN 120 sets the PI bit(s) assigned for AT1 to indicate a non-page (e.g., AT1's PI bit="0"), 415, and the RAN 120 transmits the PI bits on the forward link QPCH (e.g., at a next QPCH cycle) with AT1's PI bit(s) set to a non-page status, 420. For example, if AT1 is assigned a single PI bit and AT1's PI bit is a $15^{th}$ bit among 16 PI bits in the QPCH cycle, the QPCH cycle can be configured as follows, in an example:

TABLE 1

| | Example QPCH cycle | | | | | | | | | | | | | | | |
|---|---|---|---|---|---|---|---|---|---|---|---|---|---|---|---|---|
| PI bit #: | 1 | 2 | 3 | 4 | 5 | 6 | 7 | 8 | 9 | 10 | 11 | 12 | 13 | 14 | 15 | 16 |
| PI bit value | X | X | X | X | X | X | X | X | X | X | X | X | X | X | 0 | X | where PI bits set to a lower logic level (e.g., binary "0") indicate a non-page, and PI bits set to "X" indicate a "don't care" state (i.e., these PI bits can be set to either "0" or "1" without affecting AT1).

Next, AT1 monitors the QPCH cycle and detects that its PI bit or bits do not indicate a page, 425. If AT1 woke up from an idle state to check the QPCH cycle, AT1 can resume idle mode until powering-up to evaluate the next QPCH cycle. Likewise, it will be appreciated that any other ATs assigned the same PI bit(s) as AT1 also check the QPCH cycle and detect the non-page status of the PI bit in 425.

In 435, the application server 170 (or other initiator) requests that multicast packets be sent to a multicast group including at least AT1. Accordingly, in 435, the multicast packets are routed to the BSN 165. In 440, the BSN 165 forwards the multicast packets over the BCA10 connection to the RAN 120. For example, the multicast packets are first forwarded to the BSC/PCF 122, and the BSC/PCF 122 analyzes the multicast group members for the multicast packets and forwards the multicast packets to each MPT/BS 124 serving one or more multicast group members.

Once the RAN 120 receives the multicast packets to be sent to multicast group members in association with a multicast session (e.g., a broadcast multicast service (BCMCS) session), the RAN 120 determines the UATIs for each multicast group member. The RAN 120 applies a hash function to each UATI or alternative unique identifiers of the AT (e.g., in protocols other than 1xEV-DO, as mentioned above) in order to assign at least one PI bit on the QPCH to each multicast group member, 450. In an example, the hashing step 450 may be performed in advance of the receipt of the multicast packets from 440, and as such need not be performed each time multicast packets are received. In other words, the RAN 120 can maintain a table with each UATI (or other unique identifier) and its associated PI bit position(s) within the QPCH cycle on the QPCH. The hashing function applied in 450 to the multicast group members can be the same hashing function applied to AT1's UATI in 405.

After determining the PI bit positions for each multicast group member, the RAN 120 sets the PI bits assigned for each multicast group member to indicate a page (e.g., multicast group member PI bits="1"), 455, and the RAN 120 transmits the QPCH cycle on the forward link QPCH with each multicast group member's PI bit set to a page status, 460. The multicast group members, including AT1, monitor the QPCH cycle and detect that their respective PI bits indicate a potential page, 465. Next, because the multicast group members detect a page indication on the QPCH cycle, the multicast group members next confirm the page on the downlink CCH (e.g., by decoding the CCH capsule following the QPCH cycle on the downlink CCH, in EV-DO), 470. For example, in EV-DO, the downlink CCH capsule following the CCH capsule for the QPCH cycle indicates whether a given AT is actually paged, whereas the CCH capsule corresponding to the QPCH cycle only indicates a potential page. Alternatively, in a 1× implementation for example, as noted above, the PCH can be checked in 470 (e.g., a Forward Link Paging Channel (F-PCH) or a Forward Link-Common Control Channel (F-CCCH) in a 1x network), after a given time offset from the QPCH cycle. The RAN 120 then transmits the multicast packets over the air interface 104 to the paged multicast group members with group transmission (e.g., IP multicasting, IP unicasting, etc.) protocols as is known in the art, 475, and the multicast group members exit idle mode (if applicable) and monitor the multicast transmissions, 480.

However, as will be appreciated, the multicast group members are not necessarily the only access terminals that receive a PI bit indicating a potential page in 465. For example, assume that ATs 1 . . . N include ATs 1 through 10, with ATs 1 through 5 being multicast group members, and that there are 4 PI bits in the QPCH cycle. Further assume that after the hashing step 450, the PI bit positions of ATs 1 through 10 are as follows:

TABLE 2

Example of PI bit positions for ATs within a QPCH cycle

| PI bit position: | 1 | 2 | 3 | 4 |
|---|---|---|---|---|
| AT #: | 1, 4, 5, 6 | 2, 7, 8, 9 | 3 | 10 |

Referring to Table 2 (above), (i) PI bit position #1 includes multicast group members AT1, AT4 and AT5, (ii) PI bit position #2 includes multicast group members AT2, AT7, AT8 and AT9, (iii) PI bit position #3 includes multicast group member AT3 and (iv) PI bit position #4 does not include any multicast group members. Accordingly, PI bit positions #1, #2 and #3 each include at least one multicast group member, and the RAN 120 sets PI bit positions #1, #2 and #3 to indicate a page, 455 (e.g., PI bit positions #1, #2 and #3="1"). However, as will be appreciated by one of ordinary skill in the art, non-member ATs 6, 7, 8 and 9 are also assigned PI bits #1 and #2, respectively. Thus, ATs 6, 7, 8 and 9 will detect a potential page upon receipt of the QPCH cycle, and will expend additional power to check at least one other downlink CCH capsule (e.g., or the PCH or F-CCCH in 1x) to confirm the page. Thus, a high number of non-member ATs can receive a "false-positive" setting of their respective PI bits during a multicast session. In the example provided above with respect to Table 2, each multicast group member is assigned a single PI bit that indicates a potential page for that AT. However, it will be appreciated that other embodiments can be directed to ATs or multicast group members being assigned multiple PI bits, such that each of the multiple PI bits would be set to an active page status to indicate a potential page for that AT.

FIG. 5 illustrates another conventional process of paging multicast group members for a multicast communication. Referring to FIG. 5, in 500, ATs 1 . . . N monitor the QPCH periodically to determine whether a potential page is indicated. In 505, the application server 170 (or other initiator) requests that multicast packets be sent to a multicast group including a number of multicast group members. Accordingly, in 505, the multicast packets are routed to the BSN 165. In 510, the BSN 165 forwards the multicast packets over the BCA10 connection to the RAN 120. For example, the multicast packets are first forwarded to the BSC/PCF 122, and the BSC/PCF 122 analyzes the multicast group members for the multicast packets and forwards the multicast packets to each MPT/BS 124 serving one or more multicast group members.

Once the RAN 120 receives the multicast packets to be sent to multicast group members in association with a multicast session (e.g., a BCMCS session), the RAN 120 sets the QPCH cycle to indicate a broadcast page, 515. The broadcast page does not mean that the multicast packets are broadcast to ATs 1 . . . N, but rather means that the QPCH cycle (or more than one QPCH cycle) indicates, to each of ATs 1 . . . N, to monitor another downlink CCH portion to confirm the broadcast page (e.g., in EV-DO, as noted above, this means checking the next CCH capsule on the CCH cycle following the QPCH cycle's CCH capsule). The QPCH cycle can be set to indicate a broadcast page by modifying a header of the QPCH cycle as is known in the art, or alternatively by setting each PI bit within the QPCH to indicate a page (e.g., each PI bit="1"). For example, if the QPCH cycle includes 16 PI bits, the QPCH cycle configured to indicate a broadcast page can be as follows:

TABLE 3

Example Broadcast-page QPCH cycle

| PI bit #: | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| PI bit value | 1 | 1 | 1 | 1 | 1 | 1 | 1 | 1 | 1 | 1 | 1 | 1 | 1 | 1 | 1 | 1 |

Next, the RAN 120 transmits the QPCH cycle on the forward link QPCH either with (i) a broadcast page indicated in a header of the QPCH cycle or (ii) each PI bit set to indicate a page status, 520. The ATs 1 . . . N, monitor the QPCH cycle and detect a potential page, 525. Next, the ATs 1 . . . N further evaluate the downlink CCH (e.g., in EV-DO, by checking a CCH capsule following the QPCH cycle's CCH capsule), 530, and the multicast group members confirm an actual multicast page, whereas the non-member ATs only confirm a page only if the non-member ATs are separately paged (e.g., by another multicast or unicast session). The RAN 120 then transmits the multicast packets over the air interface 104 to the paged multicast group members with group transmission (e.g., IP multicasting, IP unicasting, etc.) protocols as is known in the art, 535, and the multicast group members exit idle mode (if applicable) and monitor the multicast transmissions, 540.

However, similar to activating PI bits for each multicast group member in a unicast fashion, the broadcast page of FIG. 5 typically requires a number of "false-positive" page indications to non-member ATs, which can consume power unnecessarily at those non-member ATs. Accordingly, embodiments of the present invention are directed to paging protocols for multicast session that reduce the number of non-member ATs that receive false-positive page indications for multicast sessions.

FIG. 6 illustrates a process of assigning PI bits to multicast groups, and FIG. 7 illustrates a process of paging multicast group members for a group communication according to an embodiment of the present invention. It will be appreciated that FIG. 6 is primarily directed to a MATI implementation, and as such is specific to a group session based on IP multicast, and not necessarily related to IP unicast. FIG. 7, on the other hand, is more generic, and while examples are given with respect to the MATI in FIG. 7, FIG. 7 can be implemented in a non-MATI manner that can be directed to group sessions based on IP unicast or IP multicast.

Referring to FIG. 6, in 600, the RAN 120 assigns a header configuration for the QPCH cycle that indicates the presence of one or more multicast PI bits. For example, a particular bit setting within the reserve field of the EV-DO MAC header of the QPCH cycle can be used to indicate the presence of one or more multicast PI bits within the QPCH cycle. Table 4 (below) illustrates a number of examples of QPCH cycle headers for MAC layer control channel QPCH cycles (e.g., in a 1xEV-DO Rev. A network). As will be appreciated, while not illustrated in Table 4, other embodiments can be directed to header configurations for QPCH cycles in an F-PCH or F-CCCH in a 1x network, for example.

TABLE 4

QPCH cycle header examples

| Field | Length (bits) |
| --- | --- |
| SynchronousCapsule | 1 |
| FirstPacket | 1 |
| LastPacket | 1 |
| Offset | 2 |
| SleepStateCapsuleDone | 1 |
| Reserved | 2 |

After assigning the header configuration in 600, the RAN 120 informs ATs that are present within one or more multicast groups of the assigned header configuration such that the multicast group member ATs can analyze the headers of QPCH cycles to determine whether to check an associated PI bit for a multicast group, 605. In another example, the 2-bit reserved field of the QPCH cycle header can be set to indicate the presence of a page to multicast ATs (e.g., in place of, or in addition to, PI bits within the actual QPCH cycle).

Next, the RAN 120 determines a multicast access terminal identifier (MATI) for a particular multicast group, 610. The MATI is a unique identifier of a multicast group, whereas the UATI (discussed above) is a unique identifier of a particular access terminal. In 615, the RAN 120 applies a hash function to the MATI to map a PI bit position within the QPCH cycle to the multicast group identified by the MATI.

The hash function of 615 can be configured in any number of ways. For example, the MATI hash function can be configured to be the same as the UATI hash function described above with respect to 405/450 of FIG. 4. As will be appreciated by one of ordinary skill in the art, both UATIs and MATIs can be hashed to the same PI bits. In another example, if a multicast group is expected to be large, the hash function can assign the MATI to a "reserved" multicast PI bit position within the QPCH cycle, wherein UATIs are not hashed to the reserved multicast PI bit position. While the above examples illustrate a few potential hash functions that may be applied in 615, it will be appreciated that other embodiments of the present invention can be directed to an implementation of any type of well-known hash function in 615. After hashing the MATI to the QPCH cycle for the given multicast group, the RAN 120 informs the multicast group members of the given multicast group of the assigned PI bit position. Thus, as will be described in greater detail below with respect to FIG. 7, the multicast group members of the given multicast group check the PI bit for the given multicast group (610, 615, 620) if the header configuration of the QPCH cycle indicates that one or more multicast groups are being paged (600, 605). The 1x and EV-DO standards define hash functions that are utilized for enabling QPCH cycles within its framework.

Referring to FIG. 7, ATs 1 . . . N monitor the QPCH periodically to determine whether potential pages are present within the QPCH cycle. In 705, the RAN 120 determines whether any multicast groups are to be paged. For example, if the RAN 120 receives one or more multicast packets for transmission to a multicast group, the RAN 120 can determine to page that multicast group in 705. In 705, assume the RAN 120 determines that no multicast groups are to be paged, and therefore the RAN 120 configures the header of the QPCH cycle to indicate that no multicast pages are present, 710. For example, in 710, the RAN 120 configures the header of the QPCH cycle can be configured in a conventional manner (e.g., different than the header configuration as determined in 600 of FIG. 6). Next, the RAN 120 transmits the PI bits of the QPCH cycle to ATs 1 . . . N. Here, the QPCH cycle includes only unicast PI bits paging ATs based on hashed UATIs, as is known in the art and described above with respect to portions of FIG. 4.

ATs 1 . . . N, which are monitoring the QPCH (e.g., by temporarily powering up while in an idle state, except for ATs that are engaged in an active communication session), receive the QPCH cycle transmitted by the RAN 120. ATs 1 . . . N analyze the header of the QPCH cycle and determine that no multicast pages are contained therein, 720. Accordingly, ATs 1 . . . N next evaluate their respective unicast PI bits to determine whether a potential unicast page is present for the respective ATs, 725. While not illustrated within FIG. 7 for the sake of clarity, ATs among ATs 1 . . . N that determine a potential page is present can further check the downlink CCH (e.g., by decoding a subsequent CCH capsule in EV-DO) to confirm the page, whereas ATs among ATs 1 . . . N that determine a potential page is not present need not further decode the CCH cycle (e.g., at least until a next QPCH cycle on a future CCH cycle), resume idle mode, etc.

In 730, the application server 170 (or other initiator) requests that multicast packets be sent to a multicast group including a number of multicast group members. Accordingly, in 730, the multicast packets are routed to the BSN 165. In 735, the BSN 165 forwards the multicast packets over the BCA10 connection to the RAN 120. For example, the multicast packets are first forwarded to the BSC/PCF 122, and the BSC/PCF 122 analyzes the multicast group members for the multicast packets and forwards the multicast packets to each MPT/BS 124 serving one or more multicast group members.

Accordingly, in 740, the RAN 120 determines whether any multicast groups are to be paged. Here, because the BSN 165 has forwarded multicast packets to be transmitted to a given multicast group, the RAN 120 determines to page the given multicast group in 740. Next, in 745, the RAN 120 configures the header of the QPCH cycle to indicate the presence of one or more multicast pages. For example, the header configuration can correspond to the configuration established within 600 of FIG. 6. The RAN 120 also sets the multicast PI bit for the given multicast group on the QPCH cycle to indicate a page of the given multicast group, 750. The multicast PI bit for the given multicast group corresponds to the PI bit position established in 615 with the hash function.

In 755, the RAN 120 transmits the QPCH cycle including the (i) configured multicast indicating header and (ii) the PI bits, to ATs 1 . . . N. Unlike the QPCH cycle transmitted in 715, the QPCH cycle of 755 includes at least one PI bit indicating a multicast page in addition to any unicast PI bits that are present. Likewise, in 755, the RAN 120 configures the control channel (CCH) to indicate an actual page of the given multicast group, and transmits the configured CCH to the given multicast group. For example, the configured CCH can include a first CCH capsule including the QPCH cycle that indicates the potential page for the multicast group, and a second CCH capsule (e.g., directly following the first CCH capsule) to confirm the multicast group page.

ATs 1 . . . N, which continue to monitor the QPCH (e.g., by temporarily powering up while in an idle state, except for ATs engaged in an active communication session), receive the QPCH cycle transmitted by the RAN 120. ATs 1 . . . N analyze the header of the QPCH cycle and determine that one or more multicast pages are contained therein, 760. In 725, each of ATs 1 . . . N evaluates their respective unicast PI bits to determine whether a potential unicast page is present for the respective ATs, 765. Further, also in 765, ATs among ATs 1 . . . N that belong to at least one multicast group further evaluate the multicast PI bit(s) for the at least one multicast group to determine whether a potential multicast page is present for multicast group members. For example, the multicast PI bit(s) evaluated by the multicast group members are transferred to the multicast group members at 620 of FIG. 6.

In 770, both (i) the paged multicast group members and (ii) ATs having the same PI bit position within the QPCH cycle as any paged multicast group(s) perform an additional evaluation of the downlink CCH (e.g., by decoding the next CCH capsule that follows the CCH capsule carrying the QPCH cycle, in EV-DO protocol). Here, the paged multicast group members confirm the multicast page, whereas the ATs that have the same PI bit position within the QPCH cycle as the multicast group determine whether a unicast page is present (i.e., because the non-member ATs are not interested in the multicast page). The RAN 120 then transmits the multicast packets over the air interface 104 to the paged multicast group members with multicasting protocols (e.g., as indicated in the CCH page in 755) as is known in the art, 775, and the multicast group members exit idle mode (if applicable) and monitor the multicast transmissions, 780.

As will be appreciated by one of ordinary skill in the art, configuring multicast pages for a particular multicast group to occupy a single PI bit within the QPCH cycle based on the MATI reduces the number of false-positive page indicators for non-member ATs as compared to either the unicast implementation of FIG. 4 or the broadcast implementation of FIG. 5. As discussed above, the unicast implementation for paging multicast groups, where each multicast group member is paged with unicast protocols based on each AT's UATI, pages each PI bit associated with each multicast group member on the QPCH cycle. Likewise, the broadcast implementation for paging multicast groups sets a broadcast PI bit to page all ATs. Accordingly, mapping or hashing the MATI to a single PI bit within the QPCH cycle can reduce the number of non-member ATs that are paged for the multicast (i.e., because non-member ATs of the single PI bit are potentially inconvenienced, as opposed to non-member ATs of multiple PI bits).

However, as will be appreciated by one of ordinary skill in the art, the reduction in false-positives of non-member ATs is achieved as a tradeoff with respect to processing overhead at ATs that are members of multicast groups. In FIG. 4, each multicast group member monitors its own unicast PI bit on the QPCH cycle, but need not monitor any other PI bit. As described in FIG. 7, multicast group members evaluate at least one additional PI bit position within the QPCH cycle, which can consume resources (e.g., power, processing time, etc.) at the member ATs (e.g., unless the multicast PI bit position is mapped/hashed to the same PI bit position as a member AT's unicast PI bit).

As discussed above with respect to embodiments of the invention, the QPCH conserves power at access terminals because the access terminals need only periodically monitor the QPCH, instead of continuously monitoring a transmission channel or the remainder of the downlink CCH. In other words, when an access terminal is idle, the access terminal remains in standby mode except for periodic wake-ups to check the QPCH for a potential page. The higher the rate at which the access terminal wakes up, the lower the standby time, although the delay setup time is also reduced.

Embodiments of the invention described above with respect to FIGS. 6 and 7 have generally been directed to protocols (e.g., 1xEV-DO Rev. B) where handsets or ATs wake up relatively frequently to check its PI bit(s) on the QPCH cycle (e.g., the AT wakes up once per CCH cycle to check the QPCH cycle for a potential page). If the PI bits within the QPCH cycle are decoded by an AT and these bit(s) indicate that the AT has a page likely destined to it, the AT decodes the Control Channel capsule(s) (or PCH in 1x) to determine if there was indeed a page and/or other forms of mobile-terminated messages (e.g., for BOMs, DOS Announce messages, etc.). The downlink channel portion for confirming the page is typically offset in time from the QPCH cycle by a fixed amount. For example, in EV-DO, if a CCH capsule carrying a QPCH cycle indicates a potential page of the AT, the CCH capsule on the downlink CCH cycle for the AT to confirm the page occurs at a timeslot or capsule following the QPCH cycle. In another example, in 1x, if a QPCH cycle indicates a potential page of the AT, the PCH portion for the AT to confirm the page begins a given time (e.g., ~20 ms) after the end of the QPCH cycle. If the PI bits indicate that there was no page destined for this AT, the AT will not decode the subsequent CCH capsule and/or PCH, but will instead go to sleep (e.g., idle mode), thereby conserving battery power. If the AT is unable to decode the PI bits (or the QuickPage message) for example due to weak channel conditions, the AT continues to decode the channel portion for confirming pages (e.g., the next CCH capsule in EV-DO, etc.) to confirm or disconfirm whether page are present. \

As mentioned above, QPCH cycles are short and occur relatively frequently (e.g., once per CCH cycle within one capsule of the CCH, in EV-DO), and the higher the rate at which ATs wake up to monitor for a potential page on the QPCH, the lower the standby time of the AT (e.g., which can increase power consumption) while the call setup delay is decreased (e.g., because an AT is likely to recognize a page during a first CCH cycle at which the AT is paged). Typically, in CDMA systems, there is one QPCH cycle per control channel capsule (e.g., on the CCH in EV-DO) or PCH slot (e.g., in 1x), although it will be appreciated that the QPCH cycle can occur more frequently (e.g., more than once per CCH cycle) or less frequently (e.g., every other CCH cycle, once every three CCH cycles, etc.) in other embodiments of the invention.

Further, it will be appreciated that false positives are possible for an AT's PI bit(s) within the QPCH cycle (e.g., because PI bits are not AT-specific and a PI bit set to indicate a potential page for an AT or group of ATs does not necessarily intend to page each AT assigned to that PI bit), which can increase power consumption for the AT if the AT not actually being paged, and thereby reduce the reliability of the QPCH approach. Also, using the QPCH cycle to indicate potential pages of ATs requires a negotiation between the AT(s) and the RAN 120 (e.g., to assign the PI bit(s) to the AT(s), as in FIG. 6). In general, in cellular networks, a large number N of ATs can be registered with the RAN 120 (e.g., 50,000<N<200,000). However, the size of the QPCH cycle does not have an individual PI bit associated with each AT for efficiency purposes. Therefore, if there are 180 bits available, on an average N/180 ATs are expected to be hashed to the same PI bits. Therefore, the PI bits in general, when set, indicate the arrival of a page to any of the N/180 ATs. Since the page arrival rate for N/180 ATs is still relatively small, the AT only decodes a limited number of CCH capsules in the idle state even for large N. As a result, the QPCH provides gains to standby time for ATs in a cellular network.

Figure 8:
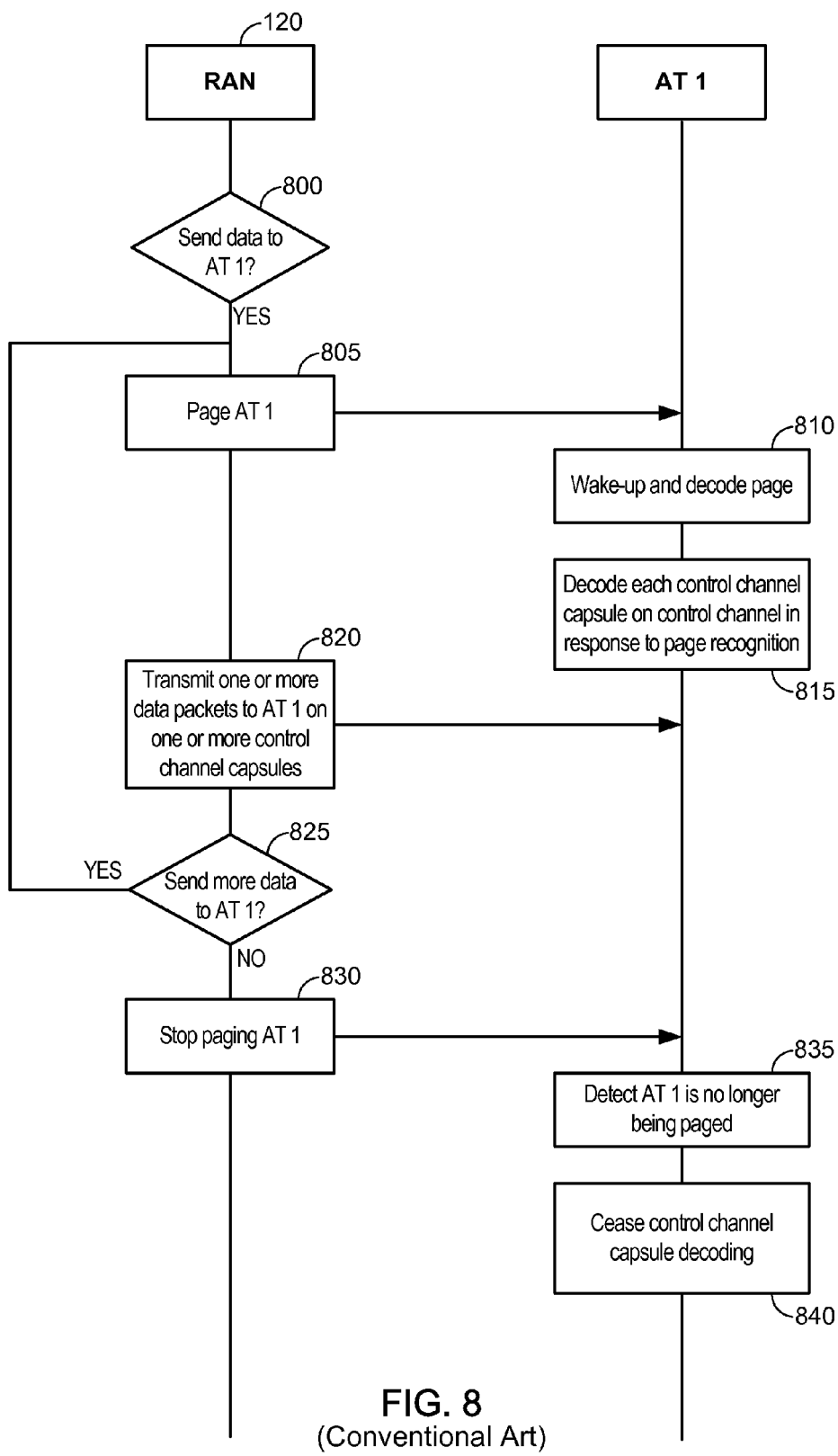
FIG. 8 illustrates a conventional paging process.

FIG. 8 illustrates a conventional paging process. Referring to FIG. 8, the RAN 120 determines whether to send data to AT 1, 800. If the RAN 120 determines to send data to AT 1, the RAN 120 pages AT 1 by sending a page message (e.g., a QuickConfig message) on a downlink CCH capsule, 805. As used in the embodiment of FIG. 8, the page message corresponds to a message that indicates whether an AT is actually being paged, in contrast to the QPCH cycle which can only indicate 'potential' pages of ATs due to the assignment of each PI bit to multiple ATs. Conventionally, after an actual page of an AT, the AT sets up a traffic channel to receive the data associated with the page, whereas an indication of a potential page prompts the AT to confirm the page on the CCH (e.g., or the PCH in certain non-EV-DO systems) As will now be described, data associated with the page can also be sent on the CCH, without necessarily requiring a separate TCH to be setup. In FIG. 8, assume that the page of 805 instructs AT 1 to monitor or decode the downlink CCH. As will be appreciated, under this assumption, paging AT 1 instructs AT 1 to decode control channel capsules on the downlink CCH until another CCH capsule indicates that AT 1 is no longer being paged.

Referring to FIG. 8, AT 1 wakes up and decodes the page on the CCH, 810, and begins decoding each control channel capsule on the downlink CCH, 815. The RAN 120 transmits one or more data packets to AT 1 on one or more of the control channel capsules on the downlink CCH, 820. While not shown explicitly in FIG. 8, assume that AT 1 successfully decodes each data packet transmitted in 820 because AT 1 continues to decode each control channel capsule.

In 825, the RAN 120 determines whether to continue sending data to AT 1. If AT 1 determines to continue sending data to AT 1, the process returns to 805 and the next CCH cycle indicates that AT 1 is still being paged. Otherwise, the next CCH cycle indicates that AT 1 is no longer being paged, 830. AT 1 monitors the CCH and detects that a page for AT 1 is no longer present, 835, and AT 1 stops decoding control channel capsules on the downlink CCH, 840.

Figure 9:
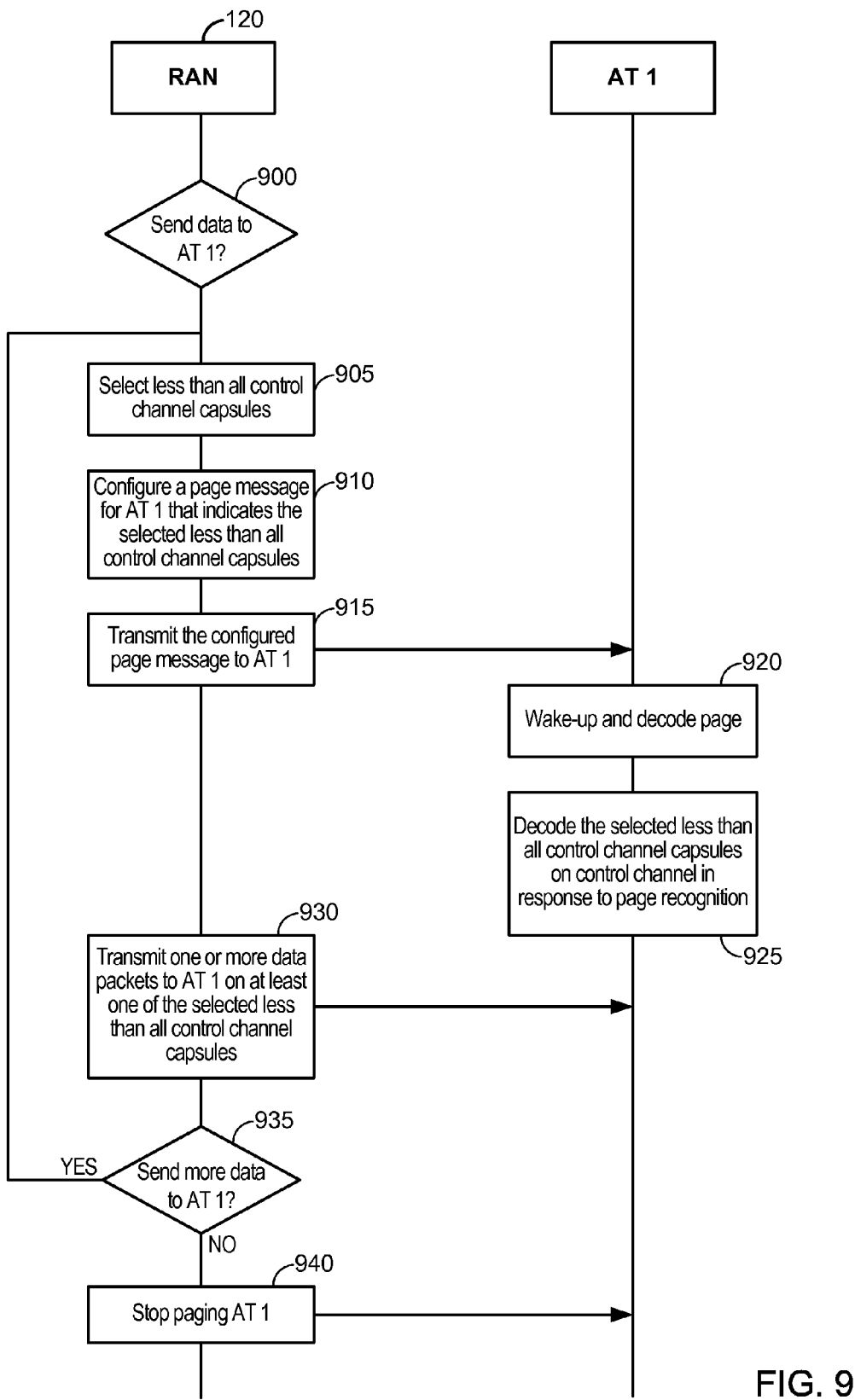
FIG. 9 illustrates a paging process according to an embodiment of the present invention.

As will be appreciated by one of ordinary skill in the art, it is possible and perhaps even likely that not all control channel capsules on the downlink CCH will include messages for AT 1, even assuming AT 1 is being paged. Accordingly, embodiments of the invention, which will now be described in greater detail with respect to FIG. 9, are directed to increasing standby time to conserve power at one or more access terminals (e.g., within a system that does not necessarily use the QPCH, such as 1xEV-DO Rev. A network), while also reducing the number of packets an AT must decode on the downlink control channel in the event of a page. In the embodiments of the invention described below, a page message (e.g., a Quick-Config message, a StorageBlobAssignment message, etc., or any message that instructs an AT to monitor a downlink channel for incoming messages) carried on a downlink CCH (e.g., the CCH in EV-DO, the PCH or F-CCCH in 1x, etc.) indicates whether one or more control channel capsules include data or other information designated for a particular AT, or group of ATs, and also indicates less than all control channel capsules among a set of control channel capsules (e.g., the set of capsules between CCH cycle intervals) for the AT to decode (e.g., instead of decoding each control channel capsule until the AT's paging status changes). While the embodiments described below are directed generally to an 1xEV-DO Rev. A network, it will be appreciated how other embodiments of the invention can be directed to any network including a downlink channel indicating pages (e.g., even if the network also includes a QPCH).

FIG. 9 illustrates a paging process according to an embodiment of the present invention. Referring to FIG. 9, the RAN 120 determines whether to send data to AT 1, 900. If the RAN 120 determines to send data to AT 1, the RAN 120 pages AT 1, 805. In 905, the RAN 120 selects less than all control channel capsules among a given set of control channel capsules (e.g., the set of control channel capsules may encompass each control channel capsule between the time the page message is transmitted until a time at which a next page message is transmitted) on the downlink CCH for AT 1 to monitor. As will be appreciated, the set of control channel capsules may include synchronous control channel capsules, sub-synchronous control channel capsules and/or asynchronous control channel capsules. In an example, the selected less than all control channel capsules may correspond to the control channel capsules upon which the RAN 120 intends to transmit packets designated for AT 1. In another example, the selected less than all control channel capsules may correspond to the control channel capsules in proximity to control channel capsules upon which the RAN 120 intends to transmit packets designated for AT 1 (e.g., to decrease the chances of a missed packet by expanding the timeslot or capsule-range for the AT(s) to decode). The selected less than all control channel capsules may include a single control channel capsule, or alternatively can include multiple control channel capsules.

In a further example, the selected less than all control channel capsules may correspond to control channel capsules immediately following the page message (e.g., transmitted in 915, below, such as a QuickConfig message in 1xEV-DO Rev. A). In this example, the data to be transmitted to AT 1 can be delay sensitive (e.g., an announce message for a push-to-talk (PTT) call, etc.), and scheduling information for transmission to AT 1 on the first available control channel capsule(s) subsequent to the page message can decrease a call setup time or initial PTT latency.

Next, in 910, the RAN 120 configures a page message (e.g., a QuickConfig message) to indicate a page of AT 1, and also to indicate the selected less than all control channel capsules. As mentioned above, a "page message" is intended to be interpreted broadly, and can be indicative of a page message, a quick-page message, or any other message (e.g., proprietary or non-proprietary) that, when conveyed to one or more ATs over the downlink control channel, results in the one or more ATs monitoring some portion of a downlink channel (e.g., such as the downlink control channel itself, which can be a PCH or Common Control Channel (F-CCCH) in 1x, a CCH in EV-DO, etc.).

In 910, the selected less than all control channel capsules can be indicated to AT 1 in a number of ways within the page message, as will be appreciated by one of ordinary skill in the art. For example, in 1xEV-DO Rev. A, there are 128 MAC indices available. One or more of these 128 MAC indices may be reserved and pre-defined to indicate to ATs the control channel capsule or capsules that include information for a paged AT. Thus, by including a reserved or pre-defined MAC index in the page message (e.g., the QuickConfig message), the RAN 120 can convey, to AT 1, the control channel capsule(s) to decode. In a specific 1xEV-DO Rev. In an example, the FTCValid and/or RPCCount bits in the QuickConfig message can be used to convey the selected less than all control channel capsule(s). In an alternative example, a StorageBlobAssignment message that is addressed to the Broadcast Access Terminal Identifier (BATI) can be used to convey the selected less than all control channel capsule(s) can be used instead of the QuickConfig message. In an example, the page message (e.g., the QuickConfig and/or StorageBlobAssignment message) can be configured to indicate a given number that corresponds to the number of consecutive control channel capsules on the downlink CCH for AT 1 to decode subsequent to the page message. For example, while the QuickConfig message is limited in its scope due to availability of a few bits, the StorageBlob* message (e.g., StorageBlobAssignment message, StorageBlobRequest message, etc.) is customizable. In an example, the contents of the StorageBlob* message can be the same as a QuickPage message. However, it will be appreciated that there is no RAN hardware upgrade required with using a customized StorageBlob* message. Alternately, the StorageBlob when used for a single call/page message transmission can indicate a time-schedule of slots for a given page/message transmission. For example, in this regard, the StorageBlob* message can 'mirror' the BOM message in the sense that scheduling information is conveyed to one or more ATs, except that the actual data transmissions occur over the CCH rather than the BCH (e.g., as is the case for BOMs). In an example, the page message can be included a DOS message on the downlink CCH, which is described in more detail within co-pending U.S. application Ser. No. 12/242,444, entitled "ANNOUNCING A CALL TO AN ACCESS TERMINAL IN A WIRELESS COMMUNICATIONS SYSTEM" filed on Sep. 30, 2008, assigned to the same assignee of the present application, and hereby incorporated by reference in its entirety. In an alternative example, individual control channel capsules or control channel capsule ranges can be indicated by the page message, such that the selected less than all control channel capsules need not fall immediately after the page message and/or consecutively relative to each other.

In an example, it will be appreciated that paging messages are typically sent from the RAN 120 to one or more access terminals, and as such correspond to the transport layer. As used herein, a "transport" layer message may correspond to a network-based transport layer (e.g., TCP or STCP), or alternatively may correspond to a transport layer between the RAN 120 and the AT (e.g., in EV-DO, this may correspond to StorageBlob* messages, DOS messages, etc.).

However, in an embodiment of 910 of FIG. 9, the RAN 120 can modify a transport layer message (e.g., a StorageBlob* message, a DOS message, etc.) at an application layer to convey information to one or more access terminals, and the use the application-layer modified transport message as the configured page message in 910. For example, a DOS message including the page message can be generated as a transport layer message, and the RAN 120 can modify the DOS message at the application layer by addressing the DOS message to a MATI or broadcast access terminal identifier (BATI) instead of a UATI, such that the modified DOS message corresponds to an application-layer modified transport message. The DOS message will then be decoded by all ATs (e.g., in case of BATI), or by a group designated by the MATI. Likewise, a StorageBlob* message configured to indicate the less than all control channel capsules can also be considered an application-layer modified transport message. Thus, a lower-layer message (e.g., at the transport layer) can be used to transfer a higher-layer (e.g., application layer) datagram. While described in FIG. 9 with respect to paging messages, it will be appreciated that other embodiments can configure other types of messages as transport layer messages that are modified from the application layer. For example, the DOS message may be configured to include an announce message in other embodiments, as described within the above-incorporated co-pending patent application Ser. No. 12/242,444.

In a further example, when a VoIP call is placed, assume that a higher-layer (e.g., application layer) message (using the SIP protocol) provides the identity of the caller. When the higher-layer message needs to be delivered to the target AT, the higher-layer message may not be capable of being sent as a DOS message because its associated message size may be too large. Rather, the RAN 120 can page the mobile and set up a TCH and then deliver the message. As the higher-layer message is large (e.g., 1000 bytes) the paging delay may be up to 1.28 seconds in 1×Rel. 0, the TCH setup may be 1.8 seconds and the message delivery time will be in the order of another second.

In an embodiment of the invention, however, the caller's identity field can be extracted by the RAN 120 and placed within a StorageBlob* or DOS message (e.g., a transport layer message) so that the target AT has some information related to the call associated with the page 2 to 3 seconds earlier. Conventionally, as noted above, the AT would decode the page without knowing the identity of the sender of the application layer message to be decoded after TCH setup. Thus, even though the application-layer message is too large, in this case, to be simply packaged within the DOS message for example, some information (e.g., caller identity) can be conveyed based on a manipulation or extraction of application-layer information and subsequent modification at the transport layer to convey this information to the AT.

Of course, the type of application-layer information that is extracted and used for modification at the transport layer need not be limited to the caller identity field. Accordingly, in another embodiment, the source and destination port numbers of a TCP connection which would normally be carried in the Transmission Control Protocol (TCP) SYN message (i.e., an application-layer message) to initialize a TCP connection could be transported in the lower layer message (e.g., a transport layer message, such as the StorageBlob* or DOS messages as discussed above).

After configuring the page message to page AT 1 to indicate the selected less than all control channel capsules, the RAN 120 transmits the configured page message to AT 1, 915. AT 1 wakes up and decodes the CCH to detect the configured page message, 920. Next, in 925, instead of simply decoding each control channel capsule on the downlink CCH until AT 1 determines it is no longer being paged, AT 1 decodes only the selected less than all control channel capsules indicated by the page message, 925. As will be appreciated, this reduces the processing load and power consumption at AT 1 because one or more unnecessary control channel capsules (i.e., control channel capsules that are known not to include packets for AT 1) need not be decoded by AT 1. Likewise, in 930, the RAN 120 transmits one or more data packets to AT 1 on at least one of the selected less than all control channel capsules. As mentioned above, the RAN 120 does not necessarily transmit to AT 1 on each of the selected less than all control channel capsules, because one or more of these control channel capsules may be selected to increase AT 1's chances of decoding one or more other control channel capsules upon which data is present.

Next, in 935, the RAN 120 determines whether to send more data to AT 1. If the RAN 120 determines to send more data to AT 1 in 935, the process returns to 905 and the RAN 120 again selects less than all control channel capsules among another set of control channel capsules for AT 1 to monitor or decode for a subsequent set period. Otherwise, if the RAN 120 determines not to send more data to AT 1 in 935, the RAN 120 stops paging AT 1, 940. As will be appreciated, AT 1 wakes up and checks the page of 940 and detects it is no longer being paged, although AT 1 may have already stopped decoding control channel capsules at this point because AT 1 only decodes the control channel capsules indicated by the page message.

In an example, configuring pages to indicate particular portions of the downlink CCH to be decoded by particular ATs or groups of ATs can be reserved for certain types of communication sessions (e.g., PTT calls) or types of ATs. Also, if each control channel capsule is scheduled by the RAN 120 to include data for a particular AT or group of ATs at least until a next CCH cycle, the RAN 120 can omit the control channel capsule selection altogether, such that the AT or group of ATs will simply decode each control channel capsule, as in the conventional art.

Further, while certain embodiments described above reference group 'calls' or multicast 'calls', it will be appreciated that certain embodiments are directed either to group calls or direct calls, while other embodiments are directed to group calls supported by IP multicasting and/or IP unicasting protocols. Still other embodiments are specific to group calls supported by IP multicasting protocols, such as embodiments that are dependent upon use of the MATI. Further, while reference has been generally made to 'calls' in the above-embodiments, it will be appreciated that the embodiments are applicable to any type of communication session, and not necessarily a 'call' between two parties. For example, embodiments can be directed to a data transport session, which is technically not a 'call'.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of paging groups of access terminals within a wireless communications system, comprising: assigning one or more paging indicator (PI) bits within a quick paging channel (QPCH) to each access terminal in a given group, wherein one or more QPCH cycles that include at least one group page are configured with a given QPCH header configuration to indicate the presence of the at least one group page within the QPCH cycle and one or more other QPCH cycles that do not include any group pages are not configured with the given QPCH header configuration; receiving one or more group packets for transmission to the given group; configuring the one or more PI bits within a given QPCH cycle of the QPCH to page the given group in response to receipt of the one or more group packets, wherein the configuring further configures the given QPCH cycle with the given QPCH header configuration to facilitate decoding of the one or more PI bits within the given QPCH cycle by the given group; transmitting, prior to transmission of the given QPCH cycle, a notification to at least one access terminal in the given group of the given QPCH header configuration; and transmitting the given QPCH cycle to the given group.

2. The method of claim 1, wherein the given QPCH cycle corresponds to one of a QPCH message in EV-DO Revision A, a Quick Page message transmitted as part of the Quick Synchronous Control Channel Capsule in 1xEV-DO, a QuickPage message in EV-DO Revision B, a physical downlink channel called the Quick Paging Channel in 1x and a proprietary message included within a Control Channel MAC packet on a synchronous or sub-synchronous cycle of a downlink Control Channel.

3. The method of claim 1, further comprising:
configuring a downlink control channel to page the given group; and
transmitting the configured downlink control channel to the given group.

4. The method of claim 3, further comprising:
transmitting the one or more group packets to the given group in accordance with the downlink control channel page.

5. The method of claim 3, wherein the downlink control channel corresponds to one of a Forward Link Paging Channel (F-PCH) or a Forward Link-Common Control Channel (F-CCCH) in a 1x network or a Control Channel in a 1xEV-DO Rel. 0, Revision A or Revision B network.

6. The method of claim 3, wherein the transmitted QPCH cycle indicates a potential page of the given group and the configured downlink control channel indicates an actual page of the given group.

7. The method of claim 1, wherein the given QPCH cycle indicates a potential page to each access terminal within the given group and at least one other access terminal that is not within the given group and shares at least one of the same one or more PI bits with the given group on the given QPCH cycle.

8. The method of claim 1, further comprising: wherein the configuring configures the given QPCH cycle with the given header configuration to facilitate paging of the given group.

9. A method of paging groups of access terminals within a wireless communications system, comprising: receiving, prior to receipt of a quick paging channel (QPCH) cycle, a notification from an access network indicating a header configuration for the QPCH cycle that indicates the presence of a group page within the QPCH cycle; receiving the QPCH cycle at an access terminal; evaluating at least one first paging indicator (PI) bit within the QPCH cycle to determine whether a potential page of the access terminal for a unicast communication is present; determining whether the QPCH cycle indicates the presence of one or more group pages; and evaluating at least one second PI bit within the QPCH cycle to determine whether a potential page of the access terminal for a given group is present based on the determining; wherein determining the presence of one or more group pages compares the header configuration indicated by the notification with the header configuration of the received QPCH cycle.

10. The method of claim 9, further comprising: receiving, prior to receipt of the QPCH cycle, another notification from the access network indicating one or more PI bit positions on the QPCH cycle that are configured to indicate the potential page of the given group, wherein the evaluated at least one second PI bit corresponds to the one or more PI bit positions indicated by the notification.

11. The method of claim 9, wherein the access terminal determines the QPCH cycle to include at least one group page if the comparison indicates that the header configuration indicated by the notification matches the header configuration of the received QPCH cycle.

12. The method of claim 9, further comprising: monitoring a downlink control channel to determine whether the given group is being paged if (i) the access terminal belongs to at least one group and (ii) the at least one second PI bit within the QPCH cycle indicates the potential page for the at least one group.

13. The method of claim 12, further comprising:
monitoring a broadcast channel (BCH) for multicast packets associated with the given group if the access terminal determines that the given group is being paged on the downlink control channel.

14. The method of claim 12, wherein the downlink control channel corresponds to one of a Forward Link Paging Channel (F-PCH) or a Forward Link-Common Control Channel (F-CCCH) in a 1x network or the Control Channel in a 1xEV-DO Rel. 0Revision A or Revision B network.

15. The method of claim 9, wherein the QPCH cycle corresponds to one of a QPCH message in EV-DO Revision A, a Quick Page message transmitted as part of the Quick Synchronous Control Channel Capsule in 1xEV-DO, a QuickPage message in EV-DO revision B, a physical downlink channel in 1x and a proprietary message included within a Control Channel MAC packet on a synchronous or sub-synchronous cycle of a downlink Control Channel.

16. The method of claim 9, wherein one or more QPCH cycles on the QPCH that include at least one group page are configured with a given QPCH header configuration and one or more other QPCH cycles on the QPCH that do not include any group pages are not configured with the given QPCH header configuration, and wherein the determining determines that the QPCH cycle indicates the presence of one or more group pages if the QPCH header configuration of the QPCH cycle corresponds to the given QPCH header configuration, wherein the determining determines that the QPCH cycle does not indicate the presence of one or more group pages if the QPCH header configuration of the QPCH cycle does not correspond to the given QPCH header configuration.

17. An access network within a wireless communications system, comprising: means for assigning one or more paging indicator (PI) bits within a quick paging channel (QPCH) to each access terminal in a given group, wherein one or more QPCH cycles that include at least one group page are configured with a given QPCH header configuration to indicate the presence of the at least one group page within the QPCH cycle and one or more other QPCH cycles that do not include any group pages are not configured with the given QPCH header configuration; means for receiving one or more group packets for transmission to the given group; means for configuring the one or more PI bits within a given QPCH cycle of the QPCH to page the given group in response to receipt of the one or more group packets, wherein the configuring further configures the given QPCH cycle with the given QPCH header configuration to facilitate decoding of the one or more PI bits within the given QPCH cycle by the given group; means for transmitting, prior to transmission of the given QPCH cycle, a notification to at least one access terminal in the given group of the given QPCH header configuration; and means for transmitting the QPCH cycle to the given group.

18. An access terminal within a wireless communications system, comprising: means for receiving, prior to receipt of a quick paging channel (QPCH) cycle, a notification from an access network indicating a header configuration for the QPCH cycle that indicates the presence of a group page within the QPCH cycle; means for receiving the QPCH cycle; means for evaluating at least one first paging indicator (PI) bit within the QPCH cycle to determine whether a potential page of the access terminal for a unicast communication is present; means for determining whether the QPCH cycle indicates the presence of one or more group pages; and means for evaluating at least one second PI bit within the QPCH cycle to determine whether a potential page of the access terminal for a given group is present based on the determination, herein the means for determining the presence of one or more group pages compares the header configuration indicated by the notification with the header configuration of the received QPCH cycle.

19. An access network within a wireless communications system, comprising: a processor coupled to memory and configured to: assign one or more paging indicator (PI) bits within a quick paging channel (QPCH) to each access terminal in a given group, wherein one or more QPCH cycles that include at least one group page are configured with a given QPCH header configuration to indicate the presence of the at least one group page within the QPCH cycle and one or more other QPCH cycles that do not include any group pages are not configured with the given QPCH header configuration; receive one or more group packets for transmission to the given group; configure the one or more PI bits within a given QPCH cycle of the QPCH to page the given group in response to receipt of the one or more group packets, wherein the configuring further configures the given QPCH cycle with the given QPCH header configuration to facilitate decoding of the one or more PI bits within the given QPCH cycle by the given group; transmit, prior to transmission of the given QPCH cycle, a notification to at least one access terminal in the given group of the given QPCH header configuration: and transmit the QPCH cycle to the given group.

20. An access terminal within a wireless communications system, comprising: a processor coupled to memory and configured to: receive, prior to receipt of a quick paging channel (QPCH) cycle, a notification from an access network indicating a header configuration for the QPCH cycle that indicates the presence of a group page within the QPCH cycle; receive the QPCH cycle; evaluate at least one first paging indicator (PI) bit within the QPCH cycle to determine whether a potential page of the access terminal for a unicast communication is present; determine whether the QPCH cycle indicates the presence of one or more group pages; and evaluate at least one second PI bit within the QPCH cycle to determine whether a potential page of the access terminal for a given group is present based on the determination, wherein the processor is configured to determine the presence of one or more group panes by comparing the header configuration indicated by the notification with the header configuration of the received QPCH cycle.

21. A non-transitory computer-readable medium comprising instructions, which, when executed by an access network within a wireless communications system, cause the access network to perform operations, the instructions comprising: program code to assign one or more paging indicator (PI) bits within a quick paging channel (QPCH) to each access terminal in a given group, wherein one or more QPCH cycles that include at least one group page are configured with a given QPCH header configuration to indicate the presence of the at least one group page within the QPCH cycle and one or more other QPCH cycles that do not include any group pages are not configured with the given QPCH header configuration; program code to receive one or more group packets for transmission to the given group; program code to configure the one or more PI bits within a given QPCH cycle of the QPCH to page the given group in response to receipt of the one or more group packets, wherein the configuring further configures the given QPCH cycle with the given QPCH header configuration to facilitate decoding of the one or more PI bits within the given QPCH cycle by the given group; program code to transmit, prior to transmission of the given QPCH cycle, a notification to at least one access terminal in the given group of the given QPCH header configuration; and program code to transmit the QPCH cycle to the given group.

22. A non-transitory computer-readable medium comprising instructions, which, when executed by an access terminal within a wireless communications system, cause the access terminal to perform operations, the instructions comprising: program code to receive, prior to receipt of a quick paging channel (QPCH) cycle, a notification from an access network indicating a header configuration for the QPCH cycle that indicates the presence of a group page within the QPCH cycle; program code to receive the QPCH cycle; program code to evaluate at least one first paging indicator (PI) bit within the QPCH cycle to determine whether a potential page of the access terminal for a unicast communication is present; program code to determine whether the QPCH cycle indicates the presence of one or more group pages; and program code to evaluate at least one second PI bit within the QPCH cycle to determine whether a potential page of the access terminal for a given group is present based on the determination, wherein the program code to determine the presence of one or more group pages compares the header configuration indicated by the notification with the header configuration of the received QPCH cycle.

* * * * *